(12) United States Patent
Unger et al.

(10) Patent No.: US 10,694,820 B2
(45) Date of Patent: Jun. 30, 2020

(54) ATTACHMENT DEVICE

(71) Applicant: WRDT, LLC, Erie, PA (US)

(72) Inventors: Robert A. Unger, Erie, PA (US);
William O. Wanner, Harborcreek, PA (US)

(73) Assignee: WRDT, LLC, Erie, PA (US)

( * ) Notice: Subject to any disclaimer, the term of this patent is extended or adjusted under 35 U.S.C. 154(b) by 0 days.

(21) Appl. No.: 14/710,937

(22) Filed: May 13, 2015

(65) Prior Publication Data

US 2015/0327632 A1 Nov. 19, 2015

Related U.S. Application Data

(60) Provisional application No. 61/992,701, filed on May 13, 2014.

(51) Int. Cl.
*A44B 17/00* (2006.01)
*A61G 13/10* (2006.01)
*F16B 5/06* (2006.01)

(52) U.S. Cl.
CPC ...... *A44B 17/0041* (2013.01); *A44B 17/0005* (2013.01); *A44B 17/0076* (2013.01); *A61G 13/10* (2013.01); *F16B 5/0692* (2013.01); *A44B 17/0023* (2013.01); *A44B 17/0064* (2013.01); *Y10T 24/4588* (2015.01); *Y10T 24/4599* (2015.01); *Y10T 24/45529* (2015.01); *Y10T 29/49828* (2015.01)

(58) Field of Classification Search
CPC ............ A44B 17/0005; A44B 17/0023; A44B 17/0041; A44B 17/0064; A44B 17/0076; A61G 13/10; F16B 5/0692; Y10T 24/45529; Y10T 24/4588; Y10T 24/4599; Y10T 29/49828
See application file for complete search history.

(56) References Cited

U.S. PATENT DOCUMENTS

| 389,420 A | 9/1888 | Sutton |
|---|---|---|
| 934,465 A | 9/1909 | Rust |
| 2,630,587 A | 3/1953 | Brown |
| 2,895,199 A | 7/1959 | Jones |
| 2,982,976 A | 5/1961 | Ferolito |
| 3,058,124 A | 10/1962 | Sturtevant |

(Continued)

FOREIGN PATENT DOCUMENTS

| EP | 0248970 A1 | 12/1987 |
|---|---|---|
| GB | 1171481 A | 11/1969 |

*Primary Examiner* — Robert Sandy
*Assistant Examiner* — David M Upchurch
(74) *Attorney, Agent, or Firm* — Jonathan M. D'Silva; MMI Intellectual Property

(57) ABSTRACT

A fastening device has a female component having a female opening featuring a broader female width at a first depth and a narrower female width at a second depth. The female component also has a female attachment surface with an interior slope rising away from the female opening. The fastening device also has a male component with a male attachment member that at least partially conforms to the interior slope of the female attachment surface. The male attachment member also has a broader male width larger than the narrower female width. The male attachment member also features a narrower male width that is not larger than the narrower female width.

27 Claims, 9 Drawing Sheets

(56) References Cited

U.S. PATENT DOCUMENTS

| | | | |
|---|---|---|---|
| 3,214,811 A * | 11/1965 | Adinolfi | A44B 1/126 24/113 R |
| 3,299,500 A | 1/1967 | Double | |
| 3,551,963 A * | 1/1971 | Mosher, Jr. et al. | A44B 17/0029 24/618 |
| 3,925,860 A * | 12/1975 | Furuya | A44B 17/0029 24/687 |
| 4,153,952 A | 5/1979 | Dussich | |
| 4,292,703 A | 10/1981 | Goguen | |
| 4,397,061 A * | 8/1983 | Kanzaka | A44B 13/007 16/2.1 |
| 4,400,856 A | 8/1983 | Tseng | |
| 4,457,050 A | 7/1984 | Kanzaka | |
| 4,628,557 A | 12/1986 | Murphy | |
| 4,646,399 A | 3/1987 | Clendinen | |
| 4,665,575 A | 5/1987 | Raught | |
| 5,075,938 A | 12/1991 | Hutchinson | |
| 5,088,137 A | 2/1992 | Rose | |
| 5,445,483 A * | 8/1995 | Fultz | B23P 19/062 29/432.2 |
| 5,579,761 A | 12/1996 | Yuschak et al. | |
| 5,593,120 A | 1/1997 | Hamerski | |
| 5,797,867 A * | 8/1998 | Guerrera | A61N 1/303 604/20 |
| 6,012,886 A * | 1/2000 | Tanamura | A47K 13/26 4/236 |
| 6,076,240 A | 6/2000 | Henzler | |
| 6,125,574 A * | 10/2000 | Ganaja | A01K 91/03 24/136 L |
| 6,199,248 B1 * | 3/2001 | Akashi | A41H 37/001 24/114.6 |
| 6,264,810 B1 * | 7/2001 | Stol | C25C 3/12 204/279 |
| 8,096,008 B1 | 1/2012 | Phillips | |
| 8,141,555 B1 | 3/2012 | Neusch et al. | |
| 8,579,570 B2 * | 11/2013 | Fellows | F16B 37/0842 411/112 |
| 8,845,606 B2 | 9/2014 | Nguyen-Demary et al. | |
| 9,309,915 B1 * | 4/2016 | Rodenhouse | B25C 7/00 |
| 2003/0039528 A1 * | 2/2003 | Yoon | B62D 29/048 411/45 |
| 2003/0115727 A1 * | 6/2003 | Yokozeki | A41F 1/006 24/591.1 |
| 2005/0059971 A1 * | 3/2005 | Michelson | A61B 17/1604 623/17.11 |
| 2009/0028660 A1 * | 1/2009 | Csik | F16B 5/0208 411/103 |
| 2010/0236029 A1 * | 9/2010 | Mattei | A44B 1/28 24/114.4 |
| 2010/0320315 A1 * | 12/2010 | Kashiwagi | B64D 45/02 244/1 A |
| 2012/0063863 A1 * | 3/2012 | Campau | F16B 39/20 411/317 |
| 2012/0304427 A1 | 12/2012 | Violato | |

* cited by examiner

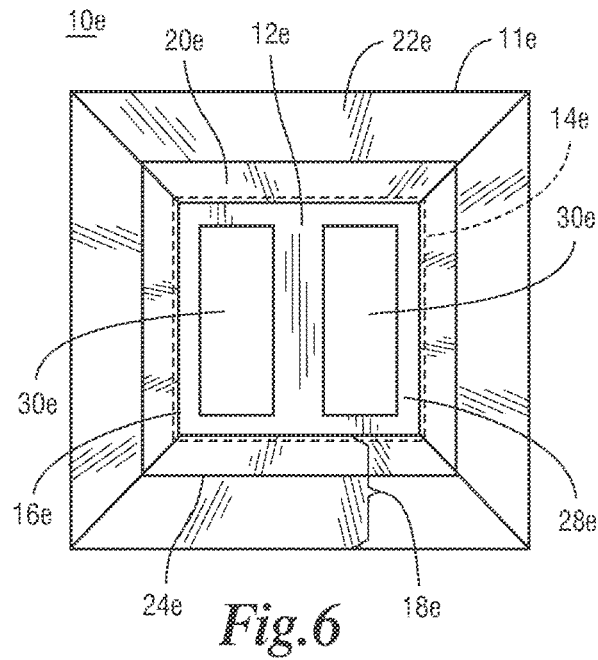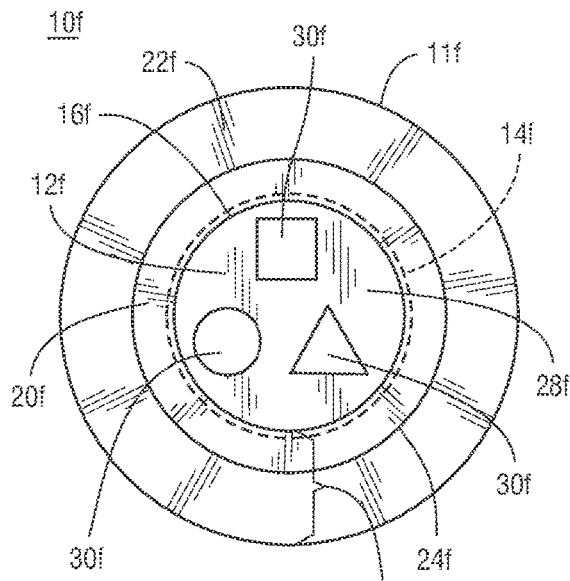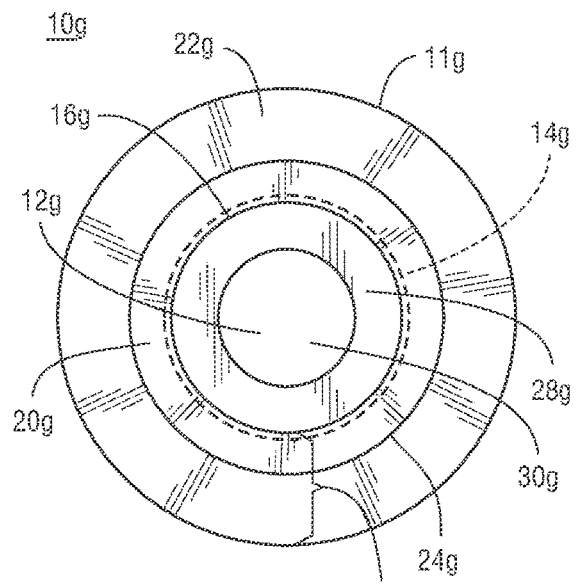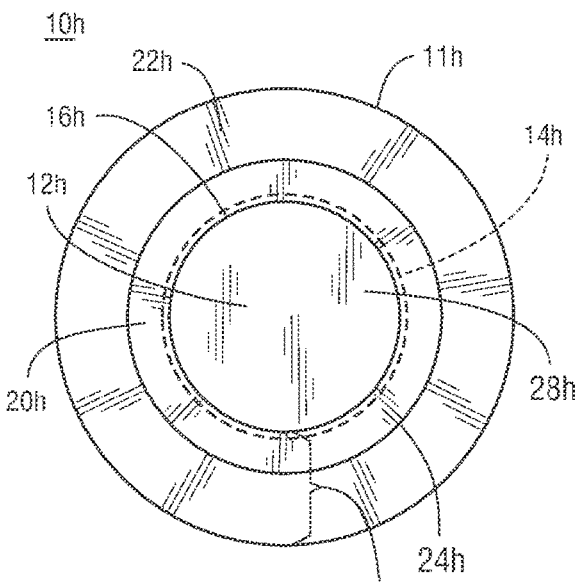

ATTACHMENT DEVICE

BACKGROUND

In surgical environments, operating tables often utilize cushions to increase patient stabilization and comfort. Surgical cushions, however, can be exposed to surgical or bodily liquids. To prevent liquid contamination, surgical cushions are often constructed with materials that are impermeable to liquids and gases to prevent the passage of any liquid into the cushion. This also prevents the release of fluid (such as air) from the cushion which would make the cushion less flexible, less compressible, more rigid, and more uncomfortable. Vents are incorporated into such cushions to allow for air flow into and out of the cushion and are typically places along the sides of the cushion. However, they remain a possible point of liquid contamination into the cushion.

When cushions are being aligned for attachment to a surgical table, the attachment mechanism may not be visible. Blind attachment may include, for example, a guiding mechanism to assist with positioning the cushion in a desired spot on a surgical table. Conventional blind attachment often utilizes hook-and-loop, such as with VELCRO®, which can be very difficult to clean and sanitize once contaminated.

What is proposed is an attachment device that allows for blind attachment of two objects, such as a cushion to a surgical table, that is easier to clean and sanitize. Furthermore, if venting of an object, such as a cushion, is required, the attachment device could be located such that the vent is repositioned to location that is less susceptible to contamination.

SUMMARY

A fastening device is provided which comprises a female component comprising a female opening comprising a broader female width at a first depth and a narrower female width at a second depth. The female component further comprises a female attachment surface comprising an interior slope rising away from the female opening. A fastening device also comprises a male component comprising a male attachment member that at least partially conforms to the interior slope. The male attachment member further has a broader male width larger than the narrower female width and also has a narrower male width not larger than the narrower female width.

In variations of the fastening device, after the male attachment member is joined to the female opening, they can rotate relative to each other. In other variations of the fastening device, the female attachment surface further comprises an exterior slope rising towards the female opening, wherein the interior slope and the exterior slope form a plateau or ridge. Other variations of the fastening device can include the female component further comprising a female mounting surface opposite the female attachment surface. The female opening has a differing width at the female mounting surface and the female attachment surface.

In another embodiment of the fastening device, the female opening is a hole. In a different embodiment of the fastening device, the female opening has a hole. In other variations of the fastening device the female opening has no hole. Some embodiments of the fastening device feature a female opening having a plurality of holes. In a differing variation of the fastening device, the female component or the male component have antimicrobial properties.

In yet another embodiment of the fastening device, the female opening has a semipermeable membrane. In a different variation of the fastening device, a plurality of female components are affixed to a surface or object and a corresponding number of male components are affixed to another surface or object. Some embodiments of the fastening device further comprise a plurality of female components and a plurality of male components, wherein at least one female component comprises an opening having a semipermeable membrane and another female component comprises an opening without a semipermeable membrane.

In variations of the fastening device, the female opening and the male attachment member are of a corresponding shape that is an oval or any other shape having at least 3 sides. Another version of the fastening device has the female component or the male component being affixed to a surface or object. The affixing comprises glue, welding, stitching, stapling, nailing, screwing, hook and loop, snaps, melting, riveting, or any combination thereof. In a different variation of the fastening device, the female component or the male component comprises urethane, vinyl, polyvinyl chloride, one or more metals, carbon fiber, wood, plastic, or phenolic.

In another version of the fastening device, the female component or the male component is radiolucent. In variations of the fastening device, the female component or the male component are stain resistant. In another embodiment of the fastening device, the female component or the male component are fire resistant. In yet another embodiment of the fastening device, the female component or the male component have an electrical resistance of <1 Mega-Ohm. Other embodiments of the fastening device feature the female component or the male component having an etched surface.

Some versions of the fastening device have the female component attached to a surface, forming a fluid passageway out of the surface through the female opening. Another variation of the fastening device further comprises, on the opposite side of the male attachment member, a male mounting surface comprising a hole. Other embodiments of the fastening device comprise the female component coupled to a vented surface, the female opening having a hole positioned over the vented surface and forming a fluid passageway through the female component. Some variations of the fastening device have the male component further comprising a male mounting surface affixed to a surface, opposite to the male attachment member.

In variations of the fastening device, the female component further comprises a female mounting surface affixed to a surface, opposite the female attachment surface. Some versions of the fastening device have the depth of the female opening exceeding the height of the male attachment member. Some embodiments of the fastening device further comprise the male attachment member coupled to the female opening, wherein the broader male width resides at a depth within the female opening closer to the female attachment surface than the distance from the second depth to the female attachment surface. In yet another version of the fastening device, the female opening overlaps with a hole in the male component, creating a fluid passageway through the male component.

Another variation of the fastening device comprising a female component for coupling a male attachment member to a female opening, where the male attachment member is for coupling to the female opening. There are also one or more guiding components for guiding the male attachment member into the female opening with a snap-fit to snap the male attachment member into the female opening. There is also a fluid passageway that provides continuous fluid passage through the female opening and the male attachment member.

A method is provided that comprises aligning a male component with a slope on a female component, applying pressure to couple the male component and the female component, thereby forming a fluid passageway through the female component and the male component. In another embodiment of the method, aligning further comprises snap-fitting the male component into the female component. Another version of the method further comprises affixing the male component to a surface.

Other versions of the method further comprise affixing the female component to a surface. A variation of the method also comprising coupling the female component to an object, affixing the male component to a surface, applying pressure to the object, and forcing fluid from the object through the fluid passageway. Another embodiment of the method comprises affixing a plurality of female components to an object, affixing a plurality of male components to a surface, and aligning each male component with the slope on a corresponding female component. This embodiment of the method further comprises applying pressure to couple each male component to its corresponding female component and bending the surface wherein the object bends to conform to the bent surface, wherein each male component remains coupled to its corresponding female component.

BRIEF DESCRIPTION OF DRAWINGS

For a more complete understanding and appreciation of this application, reference will be made to the following detailed description taken in conjunction with the accompanying drawings.

FIG. 6 is an overhead view of an embodiment of a square female component with a square opening and a back surface having two rectangular holes.

FIG. 7 is an overhead view of an embodiment of a circular female component with a circular opening and a back surface having a circular hole, a square hole, and a triangular hole.

FIG. 8 is an overhead view of an embodiment of a circular female component with a circular opening and a back surface having one circular hole.

FIG. 9 is an overhead view of an embodiment of a circular female component with a circular opening and a back surface having no holes.

DETAILED DESCRIPTION

Surgical cushions, typically comprise materials that do not permit fluids (such as air) to flow in or out. This protects surgical cushions from contamination, such as the absorption of liquids. However, the cushion needs to be compressible, by having air flow in and out of the cushion. Having vents on the cushion sides allows compressibility, but exposes the cushion to liquid contamination. Vents on the bottom of the cushion do not allow sufficient air flow when the cushion is attached to a table by conventional means such as hook-and-loop. Yet hook-and-loop fasteners allow the ability to blind-attach a cushion to a surface with relative ease.

The embodiments disclosed herein provide solutions that can be used to locate the vent on the underside of the cushion to reduce the risk of liquid contamination while allowing air flow in and out of the cushion. The embodiments described also allow for blind-attachment of cushions to surgical tables while being much easier to clean and decontaminate than hook-and-loop fasteners.

Figure 1:
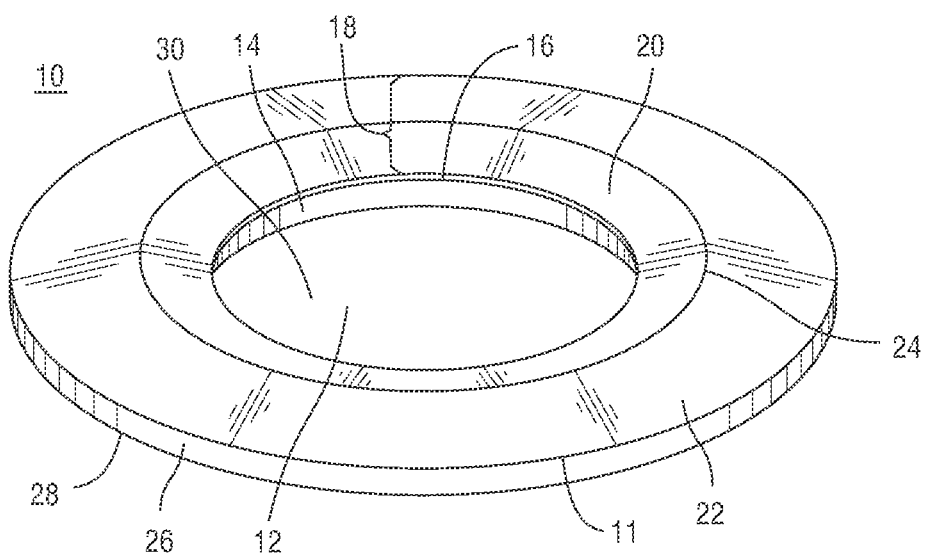
FIG. 1 is a perspective view of the top of an embodiment of a female component.

FIG. 1 shows a perspective view of an embodiment of a female component 10 with a round outer edge 11. In other embodiments, the female component 10, having one or more outer edges 11, can take any shape. The female component 10 can comprise one or more materials, such as urethane, vinyl, polyvinyl chloride, one or more metals, carbon fiber, wood, plastic, phenolic, any other suitable material, or any combination thereof. Any female component 10 may or may not comprise the same material(s) as any other female components 10. The female component 10 in some embodiments may be radiolucent, stain resistant, heat resistant, fire resistant, impact resistant, rust resistant, antimicrobial, electrically conductive (such as <1 mega-Ohm of resistance), electrically resistant, or any combination thereof.

The female opening 12 depicted is a circle in the center of the female component 10. A circular female opening 12 allows for simplified blind attachment as it allows for coupling alignment at any orientation. The female opening 12 need not be a circle, and can take any other shape in various embodiments. In other embodiments, the female opening 12 can be located anywhere else in the female component 10. In the embodiment shown, the female opening 12 is a hole through the entire female component 10. In some embodiments, such as depicted in FIG. 1, the width of the female opening 12 can vary along its depth within the female component 10. The female opening 12 as shown has at least a broadest width 14 and a narrowest width 16, with any number of widths being possible. In other embodiments, the female opening 12 (at its mouth or at any depth) can be any shape for describing the size of the opening 12. The female opening 12 in some embodiments need not maintain any consistent shape, dimensions, or symmetry.

In this embodiment, the top of the female component 10 is an arched female attachment surface 18. The female attachment surface 18 as shown has an interior slope 20 and an exterior slope 22 that converge to form a ridge 24. In this embodiment, the interior slope 20 forms a concave shape around the female opening 12. The narrowest width 16 in the female opening 12 can take the form of a flange or lip on the female attachment surface 18 (or any other surface), as shown in FIG. 1. Other embodiments may lack a flange or lip on the female attachment surface 18. In some embodiments, there may be no exterior slope 22. Other embodiments may converge an interior slope 20 and an exterior slope 22 to form a plateau. Different embodiments may lack an exterior slope 22. The female attachment surface 18 can have any shape (flat, curved, angled, plateaued, inclining, declining, any other shape, or any combination thereof) and/or any property (corrugated, etched, any other texture, adhesive, or any combination thereof).

As depicted, the side 26 of the female component 10 can be smooth. Other embodiments can have a surface, as with any surface of the female component 10, which is uneven, corrugated, jagged, irregular, adhesive, non-symmetrical, etc. Some embodiments of the female component 10 may lack a side, such as having other surfaces meet at the side to form an arch.

Figure 1A:
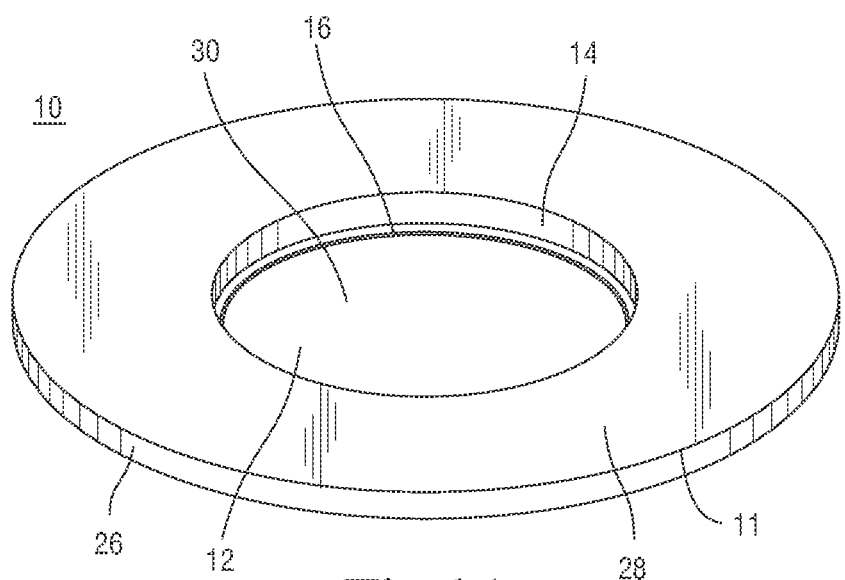
FIG. 1A is a perspective view of the bottom of the female component depicted in FIG. 1.
Figure 1B:
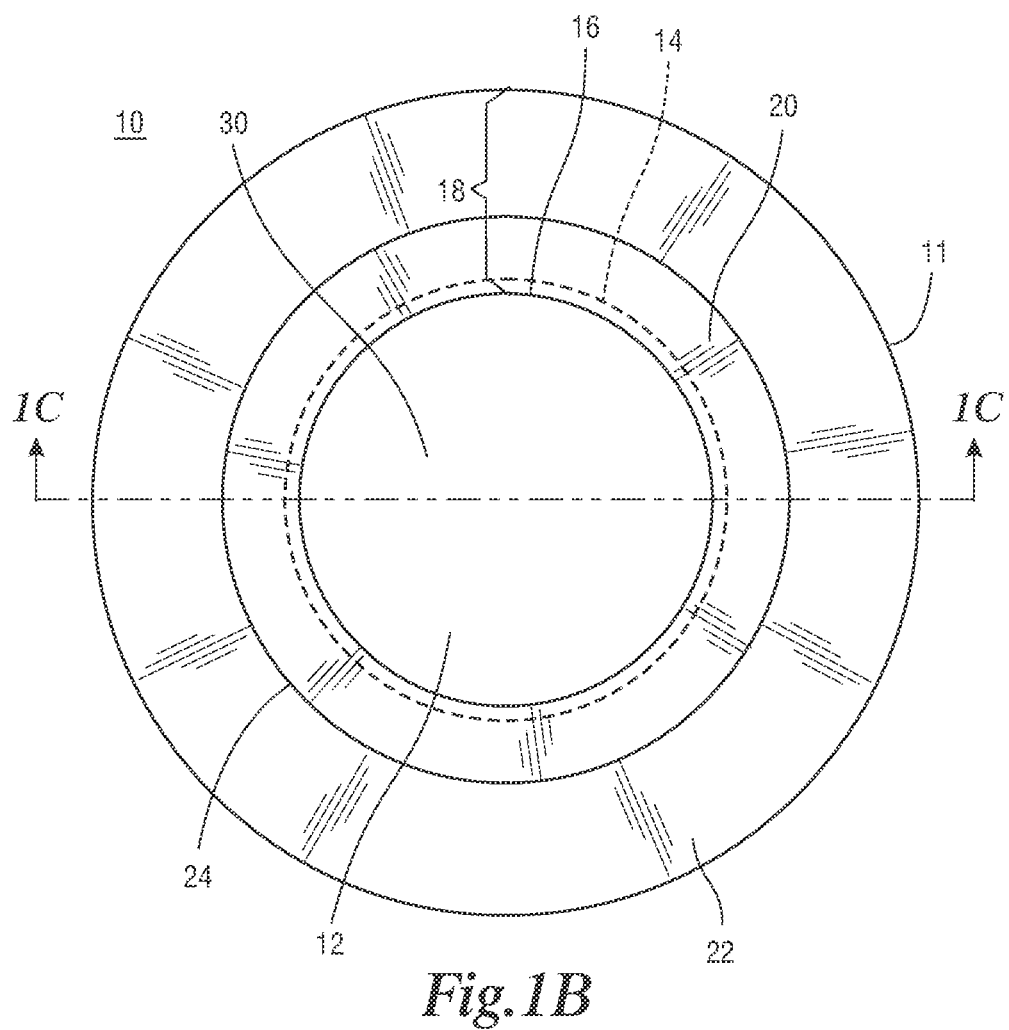
FIG. 1B is a top view of the female component depicted in FIG. 1.
Figure 1C:
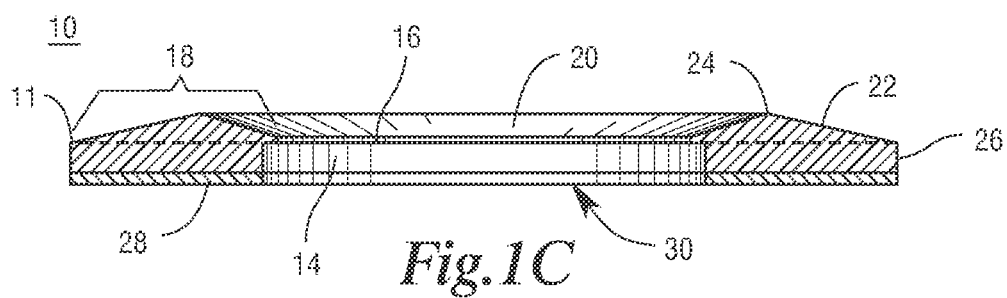
FIG. 1C is a side cross-sectional view of the female component depicted in FIG. 1.

FIG. 1A is a perspective view of the other side of the female component 10, depicting a flat female mounting surface 28 opposite the female attachment surface 18. In this embodiment, the female opening 12 passes through the female mounting surface 18 to create a single female mounting surface hole 30 that, in this embodiment is the same width as the broadest width 14. The female mounting hole 30 allows fluid passage through the female component 10. In other embodiments, the female mounting surface 28 can be any shape (flat, curved, angled, plateaued, inclining, declining, any other shape, or any combination thereof) and/or have any property (corrugated, etched, any other texture, adhesive, or any combination thereof). Here, the female opening 12 has a wider width 14 along with a narrowest width 16. In some embodiments, the narrowest width 16 can take the form of a flange or lip on the female mounting surface 28, the female attachment surface 18, or both. Other embodiments may have no flange or lip.

In some embodiments, the female mounting surface 28 is attached to an object such as a surgical cushion. In other embodiments, the female mounting surface 28 can be attached to surgical tables, walls, floors, vehicles, non-surgical cushions or pillows, any other type of object or surface, or nothing at all. The female mounting surface 28 can be attached in any manner, including (but not limited to) glue or other adhesive, welding, stitching, stapling, nailing, screwing, hook and loop, snaps, melting, riveting, any other suitable manner of attachment, or any combination thereof. In some embodiments, the female attachment surface 18 can be mounted in any manner described above with respect to the female mounting surface 28. In various embodiments, the female component 10 can be mounted or attached to any number of surfaces or objects, such as airline seats, train seats, boat seats, outdoor furniture, walls, ceilings, floors, pictures, curtains, automobiles, etc.

Figure 2:
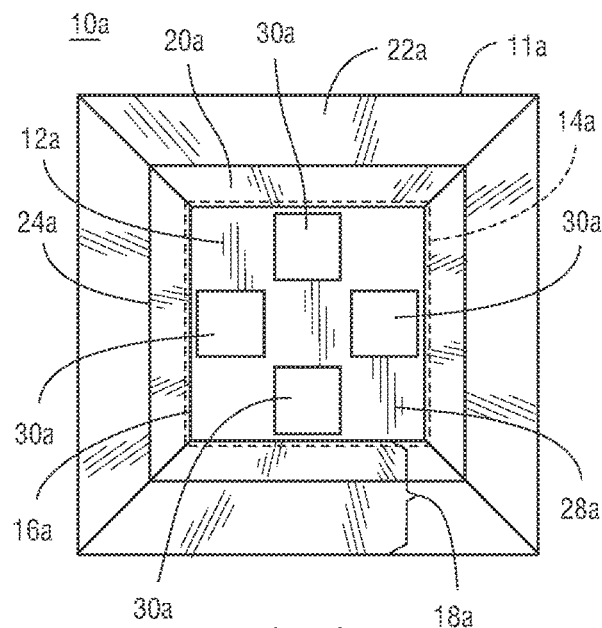
FIG. 2 is an overhead view of an embodiment of a square female component with a square opening and a back surface having four square holes.
Figure 3:
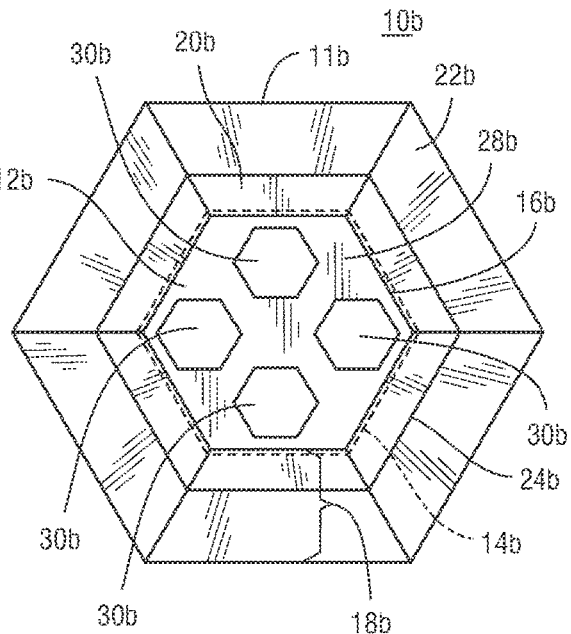
FIG. 3 is an overhead view of an embodiment of a hexagonal female component with a hexagonal opening and a back surface having four hexagonal holes.
Figure 4:
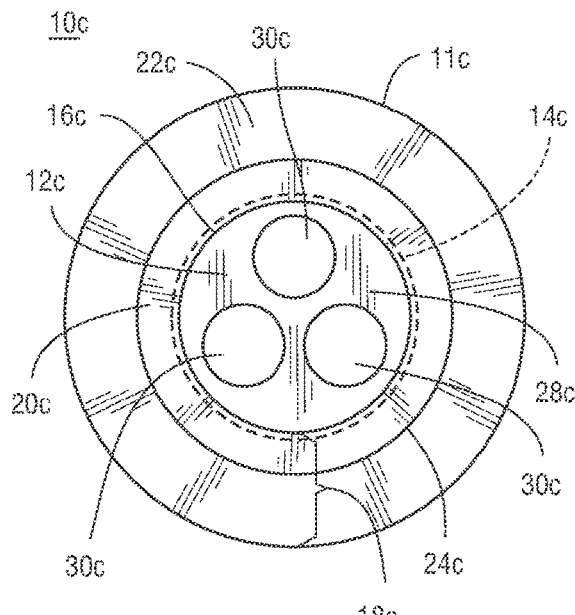
FIG. 4 is an overhead view of an embodiment of a circular female component with a circular opening and a back surface having three circular holes.
Figure 5:
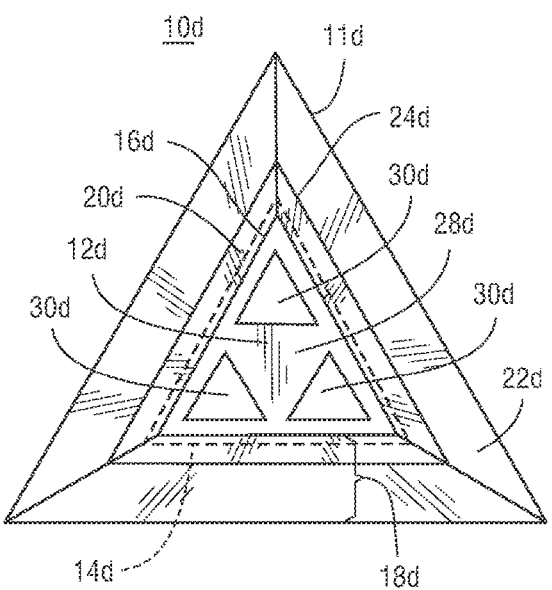
FIG. 5 is an overhead view of an embodiment of a triangular female component with a triangular opening and a back surface having three triangular holes.

FIG. 2 depicts another embodiment of female component 10a which is square in shape. In this embodiment, the female mounting surface 28a extends out into the female opening 12a. Here, there are four female mounting surface holes 30a within female mounting surface 28a which can each allow fluid passage through the female component 10a. Other embodiments can have any number of female mounting surface holes 30a within the female mounting surface 28a. Each female mounting surface hole 30a is smaller than the female opening 12a. Although each female mounting surface hole 30a is depicted as square in this embodiment, each female mounting surface hole 30a be any shape in other embodiments, where some or all of the female mounting surface holes 30a can have different shapes. In different embodiments, each female mounting surface hole 30a can have a different size and need not be symmetrically positioned with respect to each other and/or any axis. In various embodiments, one or more portions of the female mounting surface 28a can be detachable, comprise any combination of any of the materials recited for any other component discussed elsewhere, and/or have any properties discussed with respect to the female attachment surface 18a and/or the female mounting surface 28a. FIGS. 3 through 7 show various other embodiments of the female component (10b through 10f) of varying configurations, with differently shaped outer edges (11b through 11f), differently shaped female openings (12b through 12f), differently shaped female mounting holes (30b through 30f)

FIG. 8 depicts another embodiment having a single female mounting surface hole 30g in the female mounting surface 28g to allow fluid passage through the female component 10g. The female mounting surface hole 30g is smaller than the female opening 12g. Although depicted as circular, the female mounting surface hole 30g can take any shape and size, and need not be centered.

FIG. 9 depicts yet another embodiment. Although there is a female opening 12h in the female attachment surface 18h leading into the female component 10h, there is no hole in the female mounting surface 28h. This prevents the female opening 12h from extending all the way through the female component 10h. Here, the female mounting surface 28h comprises the same material as the rest of the female component 10h, and can be created as one solid piece. Various embodiments can also utilize a female mounting surface 28h that is a different solid material, a mesh, a semipermeable membrane, a vent, or any other type of configuration where the female opening 12h does not pass entirely through the female component 10h.

Figure 10:
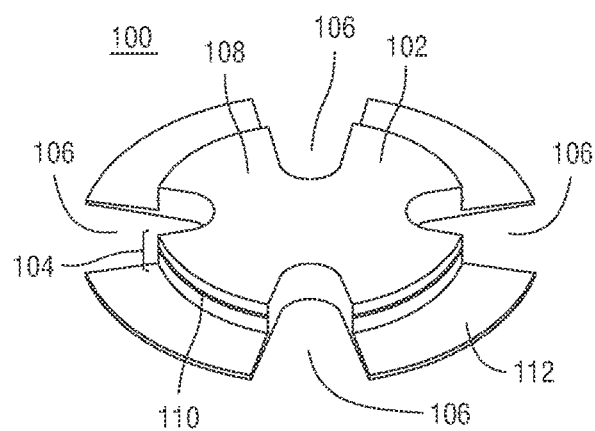
FIG. 10 is a perspective view of the top of an embodiment of a male component.

FIG. 10 depicts an embodiment of a male component 100 shown in perspective view. The male component 100 can comprise one or more materials, such as urethane, vinyl, polyvinyl chloride, one or more metals, carbon fiber, wood, plastic, phenolic, any other suitable material, or any combination thereof. The male component 100 in some embodiments may be radiolucent, stain resistant, heat resistant, fire resistant, impact resistant, rust resistant, antimicrobial, electrically conductive (such as <1 mega-Ohm of resistance), electrically resistant, or any combination thereof. Any male component 100 may or may not comprise the same material(s) as any female component 10 or as any other male component 100.

The top of the male component 100 comprises a male attachment member 102. In this embodiment, the male attachment member 102 has a cross shape formed out of a cylinder, with male attachment sides 104 forming the sides of the cylinder. Described differently, the male attachment member 102 is in the shape of a circle having male attachment member indentations 106 that extend through the male component 100 and project inward towards its center. The male attachment member 102 in other embodiments can take any other shape, and may lack male attachment member indentations 106. The top surface 108 of the male attachment member 102 can take any shape (flat, curved, angled, plateaued, inclining, declining, any other shape, or any combination thereof) and/or any properties (corrugated, etched, any other texture, adhesive, or any combination thereof).

In some embodiments, there may be only one continuous male attachment side 104, which may be (for example) round, oval, or any other shape. In various embodiments, each male attachment side 104 can be straight or take any other type of shape, independent of any other male attachment side 104. In the embodiment depicted, each male attachment side 104 has a male attachment protrusion 110. In other embodiments, each male attachment side 104 can have any number of protrusions and/or indentations, or none at all.

FIG. 10 further depicts a male mounting member 112 extending outwardly from the center of the male component 100 beneath the male attachment member 102 with a width that is greater than the male attachment sides 104 or male attachment protrusions 110. In other embodiments, the male mounting member 112 may simply be part of the male attachment member 102. In various embodiments, the male mounting member 112 can have any shape or configuration, which can include holes (not shown) or indentations 106 that need not match each other or be placed symmetrically.

Figure 10A:
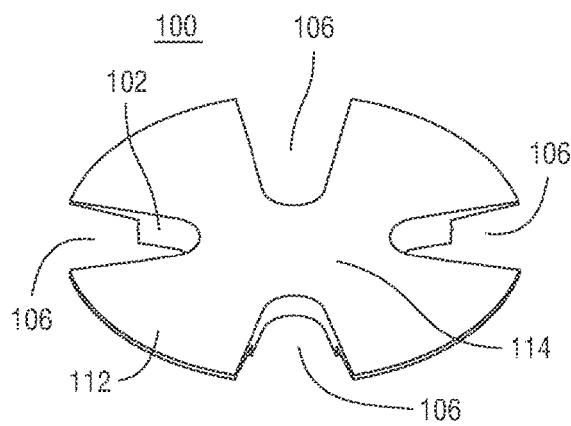
FIG. 10A is a perspective view of the bottom of the male component depicted in FIG. 10.
Figure 10B:
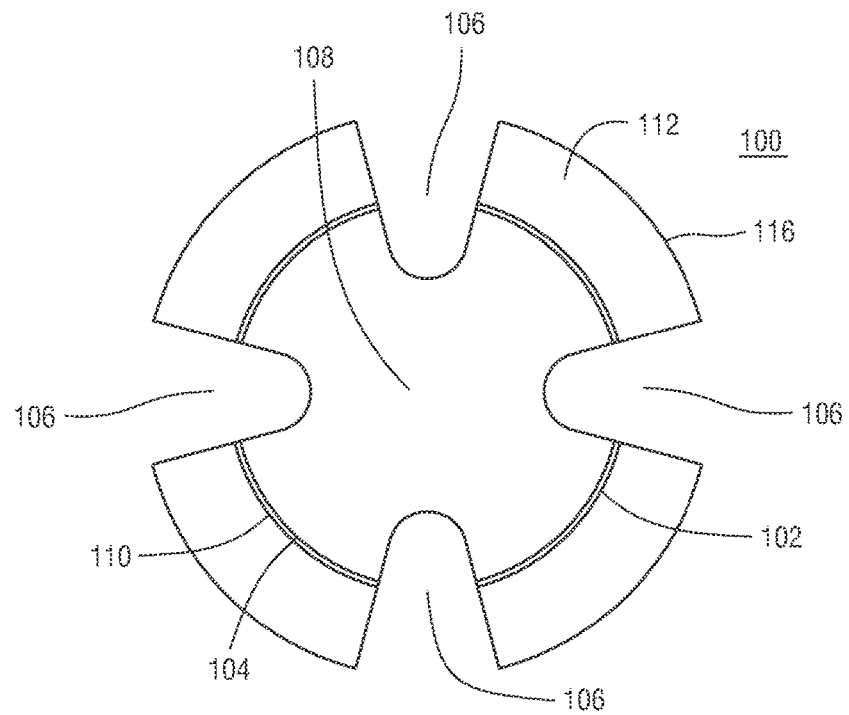
FIG. 10B is a top view of the male component depicted in FIG. 10.
Figure 10C:
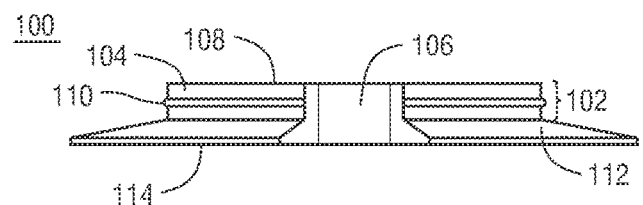
FIG. 10C is a side view of the male component depicted in FIG. 10.

FIG. 10A depicts a flat male mounting surface 114 by which the male component 100 can be attached to a surface. In embodiments, the male mounting surface 114 can be any shape (flat, curved, angled, plateaued, inclining, declining, any other shape, or any combination thereof) and/or any property (corrugated, etched, any other texture, adhesive, or any combination thereof). In some embodiments, the male mounting surface 114 is attached to an object such as a surgical table. In other embodiments, the male mounting surface 114 can be attached to walls, floors, vehicles, surgical or regular cushions or pillows, any other type of object or surface, or nothing at all. The male mounting surface 114 can be attached in any manner, including (but not limited to) glue or other adhesive, welding, stitching, stapling, nailing, screwing, hook and loop, snaps, melting, riveting, any other suitable manner of attachment, or any combination thereof. In some embodiments, either or both the male mounting surface 114 or the male attachment member 102 can be mounted in any manner described above. In various embodiments, the male component 100 can be mounted or attached to any number of surfaces or objects, such as airline seats, train seats, boat seats, outdoor furniture, etc. FIGS. 10B and 10C show top and side views of the male attachment member 100.

Figure 11:
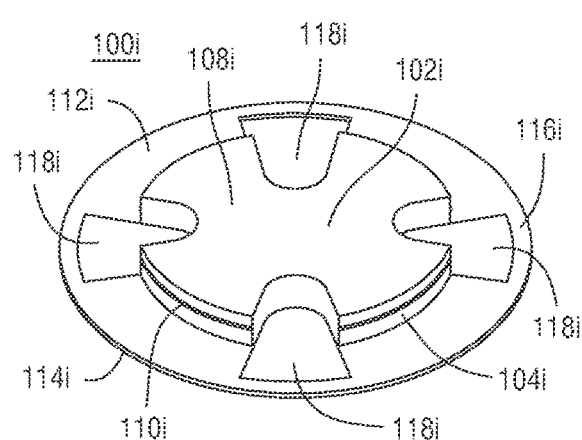
FIG. 11 is a perspective view of the top of another embodiment of a male component.
Figure 11A:
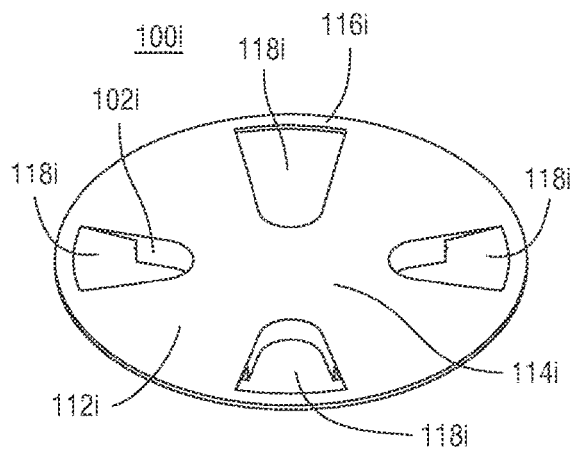
FIG. 11A is a perspective view of the bottom of the male component depicted in FIG. 11.
Figure 11B:
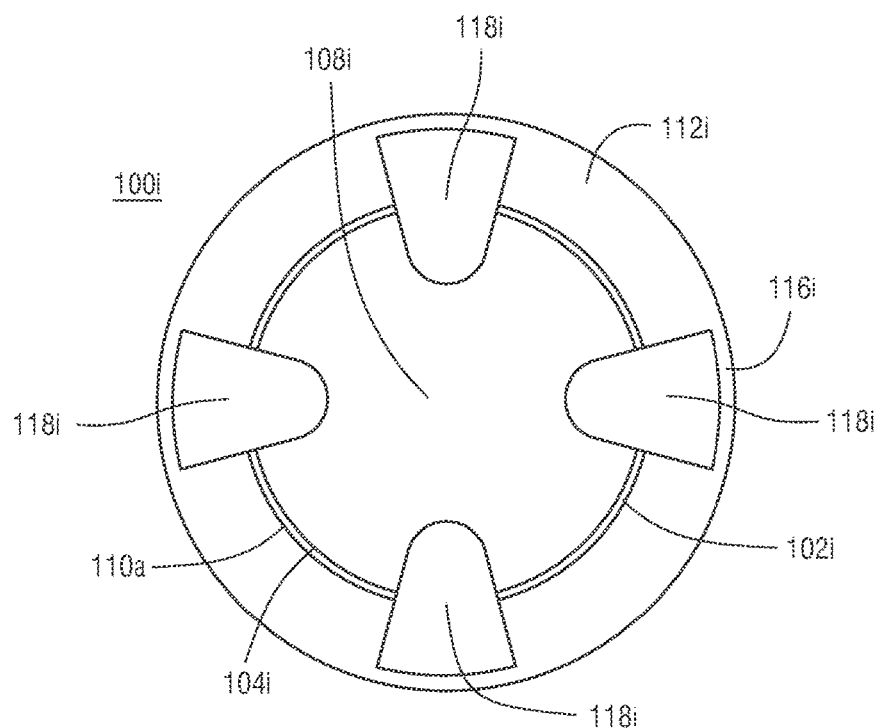
FIG. 11B is a top view of the male component depicted in FIG. 11.
Figure 11C:
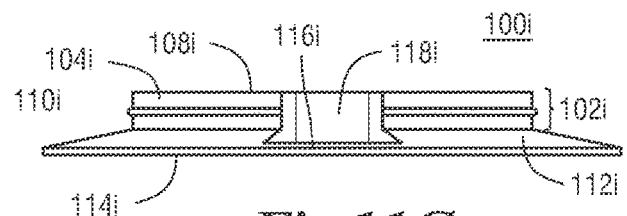
FIG. 11C is a side view of the male component depicted in FIG. 11.

FIGS. 11 through 11C depict an alternate embodiment of a male component 100i. The male mounting member 112i has an outer ring 116i that forms four male mounting member holes 118i.

Figure 12:
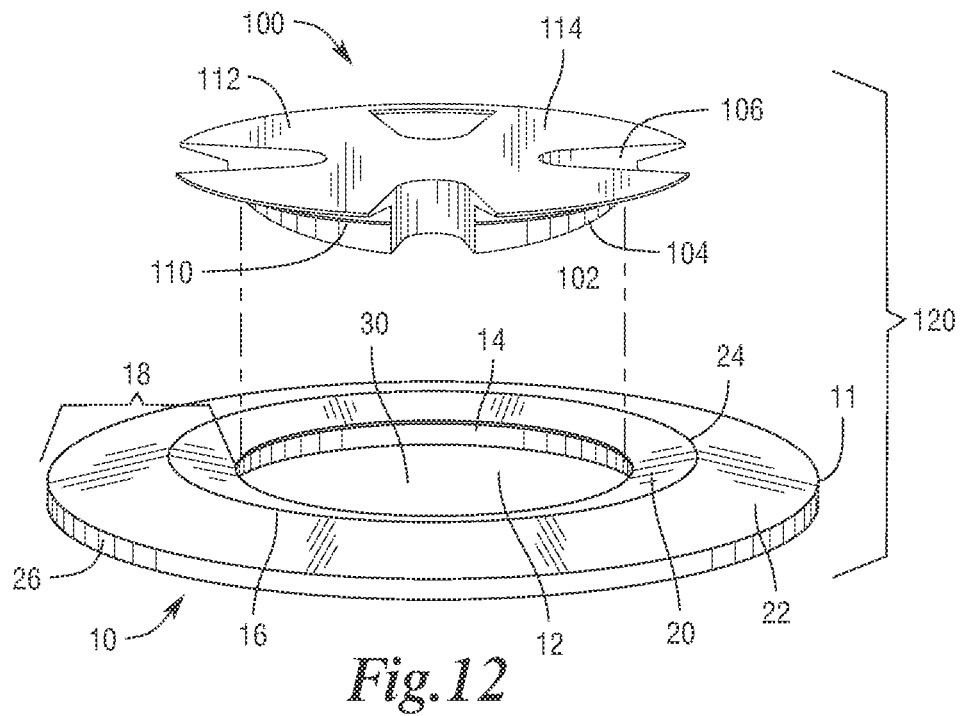
FIG. 12 is an exploded view depicting coupling of the female component of FIG. 1 with the male component of FIG. 10.

FIG. 12 depicts an exploded view of the coupling 120 of a male component 100 into a female component 10, specifically the insertion of the male attachment member 102 into the female opening 12. In this embodiment, most widths of the interior slope 20 of the female attachment surface 18 exceed the width the male attachment member 102. The concave shape of the interior slope 20 of the female attachment surface 18 can therefore guide the male attachment sides 104. For example, a user holding the female component 10 affixed to an object (thus obstructing the view of the user), can guide the female opening 12 onto the male attachment member 102 based on the concave shape of the interior slope 20 of the female attachment surface 18. The same user could also perform the same guidance by handling a surgical cushion to guide the female opening 12 as it conforms to the male attachment member sides 104. Similarly, a user holding the male component 10 (or an object to which it is affixed), could guide (by tactile feedback alone) the male attachment member 102 into the female opening 12 by the conformance of the male attachment sides 104 to concave shape of the interior slope 20.

Figure 13:
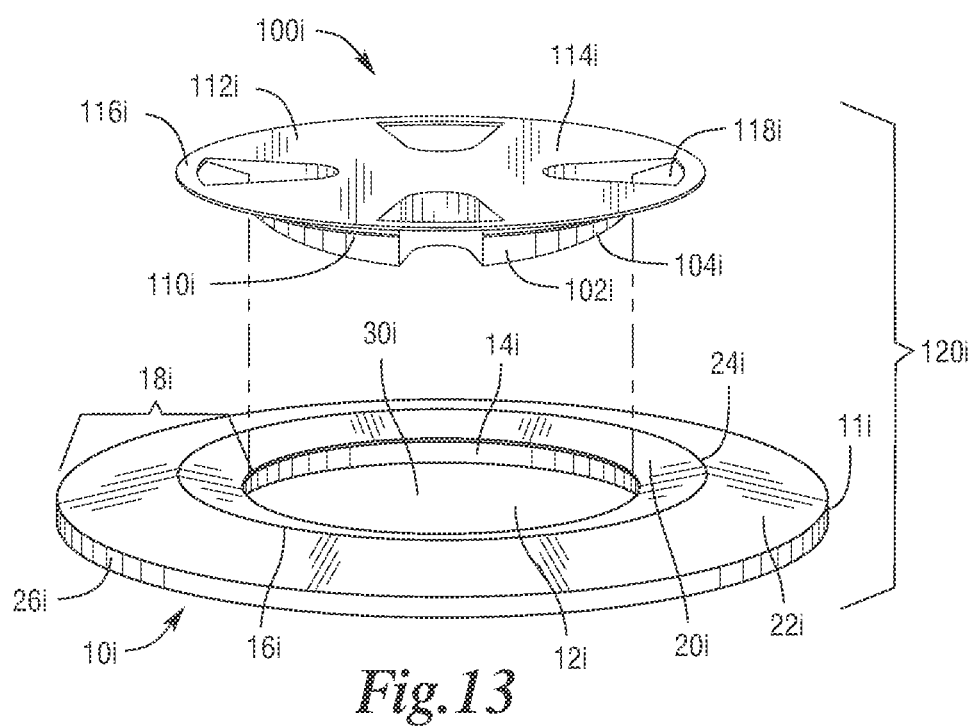
FIG. 13 is an exploded view depicting coupling of the female component of FIG. 1 with the male component of FIG. 11.

FIG. 13 depicts an exploded view of the coupling 120i of a male component 100i into a female component 10i, in which the male component 100i is similar to that shown in FIG. 11.

Figure 14:
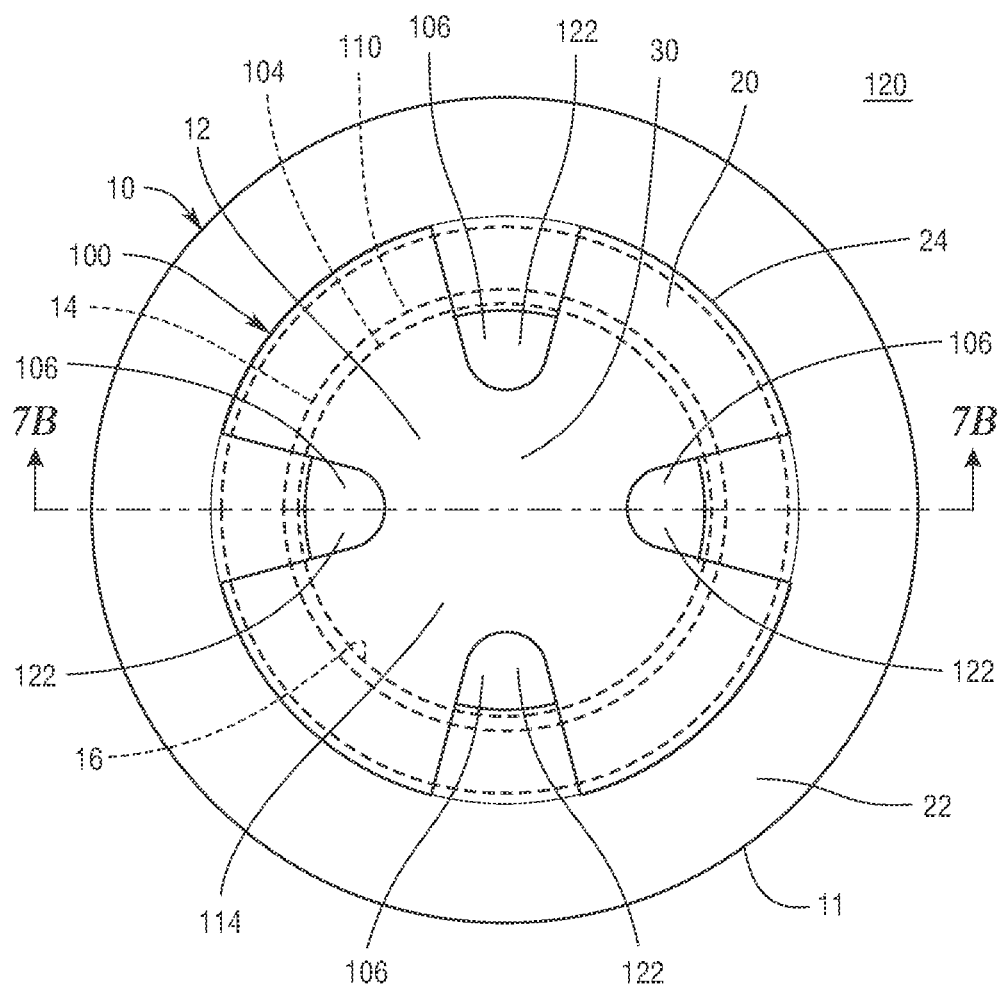
FIG. 14 is a top view of the coupling of the female component of FIG. 1 with the male component of FIG. 10.
Figure 14A:
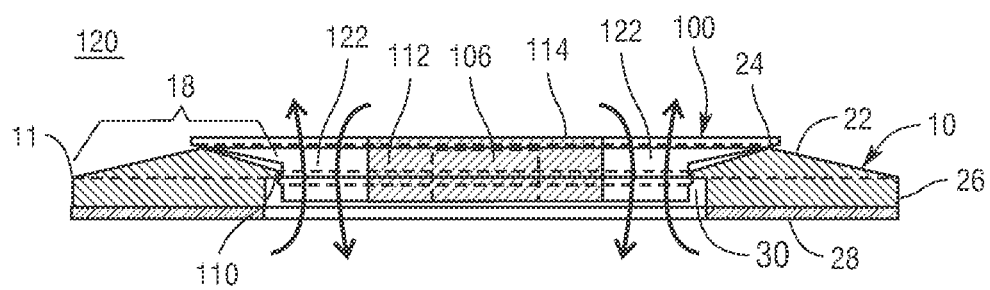
FIG. 14A is a side cross-sectional view of the coupling depicted in FIG. 14.

In some embodiments, the width of the male attachment protrusion 110 slightly exceeds that of the narrowest width 16 in the female opening 12. A user, object, or machine using sufficient force can push the male attachment protrusion 110 to a depth that is deeper inside the female opening 12 than the narrowest width 16. As shown in FIGS. 14 and 14A, this can result in a coupling (such as a snap-fit) of the male attachment member 102 into the female opening 12. In some embodiments, a snap-fit can be accompanied by the sound of a snap and/or a sudden penetration which quickly halts. Other embodiments can use any other type of sound and/or tactile feedback may be utilized to indicate coupling. In some embodiments, the snap-fit requires at least some force to remove (or unsnap) the male attachment member 102 from the female opening 12. In the embodiment depicted in FIGS. 14 and 14A, once coupled together, the male attachment member 102 and the female opening 12 are rotatable with respect to each other about the same central axis. The male attachment protrusion 110 can rotate at a depth within the female opening 12 that is deeper inside than the depth of the narrowest width 16. In some embodiments, there could be obstructions (not shown) within the female opening to restrict rotation to less than a full revolution. Some embodiments have a substantial correspondence in the shape of the female opening 12 and the male attachment member 102, although they need not be exactly the same. In such embodiments, the complimentary shape of one female opening 12 and a corresponding male attachment member 102 can be completely different from the shape that corresponds between another female opening 12 and its corresponding male attachment member 102. This could apply even if the female components 10 (or male components 100) are affixed to the same surface and/or object.

FIG. 14 depicts an overhead view embodiment where a fluid (liquid or gas, for example) passageway 122 can form once a male component 100 is coupled to a female component 10. In other embodiments, a fluid passageway can be formed a male component 100 having sufficient proximity to a female component 10, even without coupling. In this embodiment, a surgical cushion has a female component 10 affixed, with the female opening 12 being a hole through the entire female component 10. A male component 100 is affixed to a surface. Fluid (such as gas or liquid) from the surgical cushion can exit through the female opening 12 and into the fluid passageway 122. Once in the fluid passageway 122, the fluid can then exit through the male attachment member indentations 106. In other embodiments, the fluid can instead exit through male mounting member holes 118.

FIG. 14A depicts a side cross-sectional view of the same embodiment, where fluid can flow bi-directionally through the fluid passageways 122. This means that fluid can also enter through the male attachment member 102 through the male attachment member indentations 106, through the female opening 12, and into an affixed surgical cushion (not shown). In other embodiments, the male component 100 and/or the female component 10 may have a 1-way restriction to prevent or at least partially restrict the flow of fluid into either the male component 100 or the female component 10.

Figure 15:
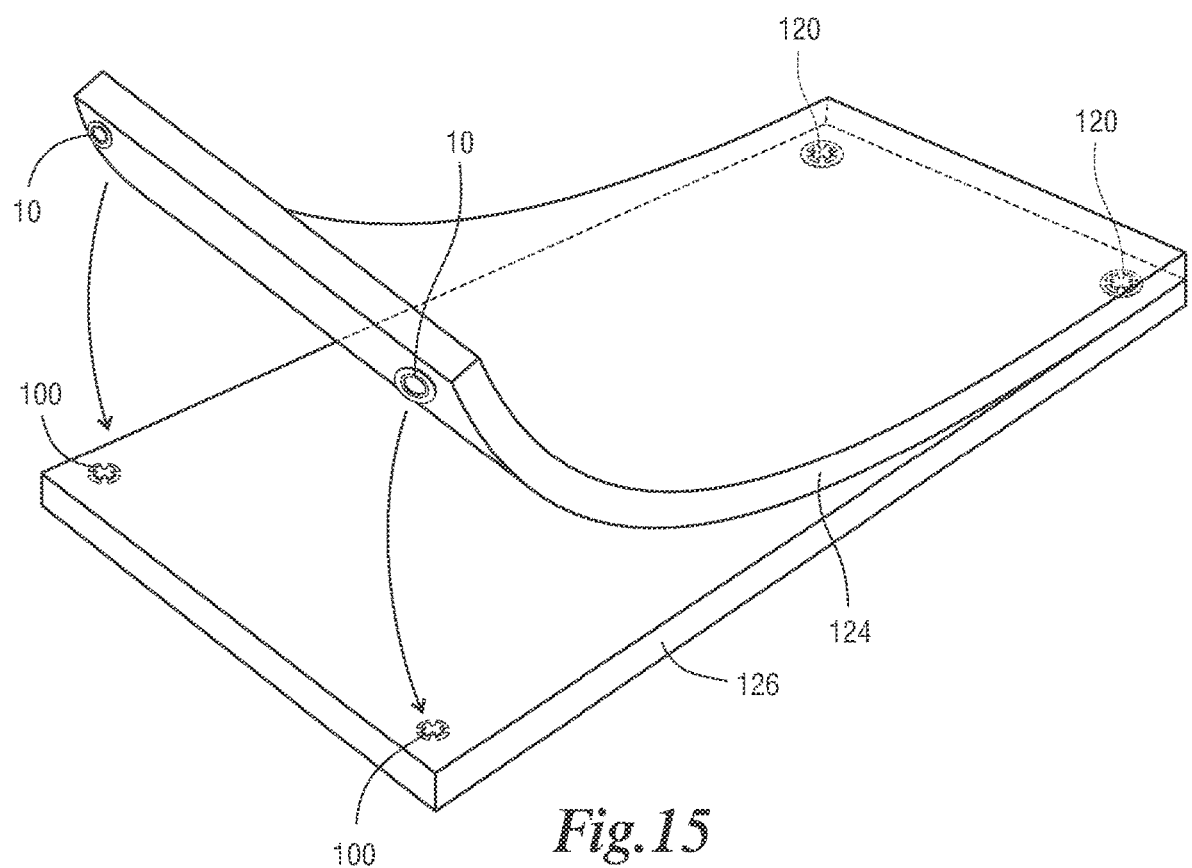
FIG. 15 is a perspective view of a cushion being affixed to a surface.

FIG. 15 depicts an embodiment with a fluid-proof surgical cushion 124 having four affixed female components 10 which have been coupled to four corresponding male components 100 on a flat portion of a surgical table 126. In some embodiments, the male component 100 is affixed to an object (or surface) such as a surgical cushion 124 and the female component 10 is affixed to a surface (or object) such as a surgical table 126. Here, there are two couplings 120 between two female components 10 and two male components 100. There are also two sets of uncoupled male components 100 and female components 10, where the coupling can be done (for example) by force applied to the top side of the surgical cushion 124 once there has been blind alignment, which can (but need not) further include the sound and feel of a snap-fit.

In some embodiments (not shown), each female component on a surgical cushion remains coupled to its corresponding male component on the surgical table, even as the surgical table bends. Due to the coupling, the surgical cushion compresses as it bends to conform with the bending surgical table. Air exits the surgical cushion due to the compression. Similarly, the surgical cushion may compress when weight (such as from a patient) is placed upon it. Conversely, air can enter the cushion (for example) when the surgical table where the bending angle of the surgical table is reduced or when weight previously placed upon the surgical cushion is reduced or eliminated. This could occur, for example, when a patient gets off of (or is removed from) a surgical cushion. In this embodiment, the female components provide the only way for fluid to leave or enter the surgical cushion. In various embodiments, some of the female components (or male components 100) that are affixed to the same object or surface may have features that are not present in other female components (or male components) in the group, respectively. For example, one female components affixed to a surgical cushion may have a semi-permeable membrane (not shown) on its backing surface. Another female component affixed to the same surgical cushion may lack such a semi-permeable membrane. In other embodiments, a female component 10 can be affixed to a table and a male component 100 can be affixed to a cushion.

Figure 16:
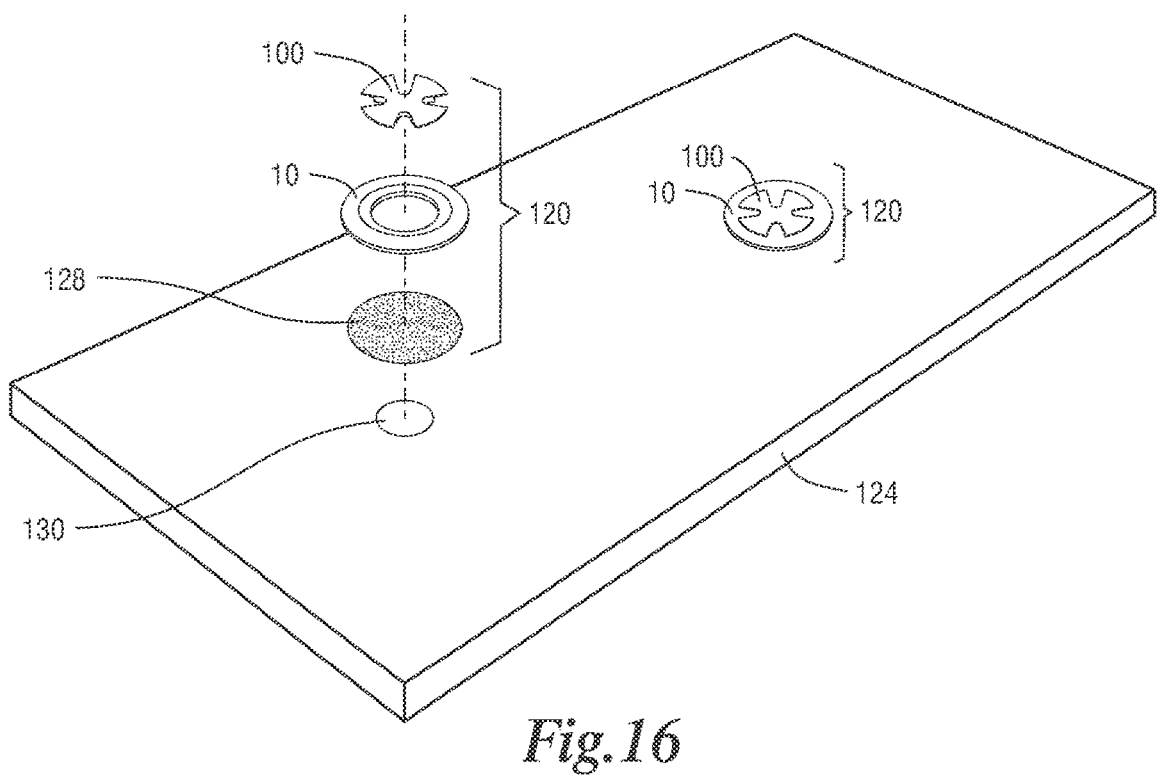
FIG. 16 is an exploded view the male component of FIG. 2 coupled to the female component of FIG. 1 above a semi-permeable membrane above a hole in a surface along with a coupled male and female component lacking a semi-permeable membrane.

FIG. 16 depicts an embodiment with depicting a coupling 120 in a standard view affixed to a surgical table pad 124 as well as an exploded view of a coupling 120. The components in the exploded view include a male component 100 on top of a female component 10 which has a semi-permeable membrane 128 affixed to its bottom. The semi-permeable membrane 128 and the female component 10 can sit above a hole 130 in the surgical table pad 124, which can allow for air flow. Any other type of membrane or filter can be used (or none at all), and a hole 130 is not required.

This application has been described with reference to several embodiments. Many modifications and alterations will occur to others upon reading and understanding the preceding specification. It is intended that the application be construed as including all such alterations and modifications in so far as they come within the scope of the appended claims or the equivalents of these claims.

What is claimed is:

1. A fastening device comprising:
    a first member having a first surface;
    a second member having a second surface;
    a female component comprising:
        a female opening, said female opening having a broader female width at a first depth and a narrower female width at a second depth;
        a female attachment surface comprising an interior slope rising away from said female opening; and
        a female mounting surface opposite said female attachment surface, said female mounting surface configured to mount said female component to said first surface,
    wherein said female opening has a total depth that extends from said female attachment surface to said female mounting surface; and
    a male component comprising:
        a male mounting member at least partially conforming to said interior slope;
        a male attachment, said male attachment member having a broader male width larger than said narrower female width, a narrower male width not larger than said narrower female width; and a height that does not exceed said total depth of said female opening; and
        a male mounting surface opposite said male attachment member, said male mounting surface configured to mount said male component to said second surface;
    said fastening device attaches said first surface to said second surface when said male component is coupled to said female component by joining said male attachment member to said female opening.

2. The fastening device of claim 1 further provides, after said male attachment member is inserted into said female opening, rotation relative to each other.

3. The fastening device of claim 1 wherein said female attachment surface further comprises an exterior slope rising towards said female opening, wherein said interior slope and said exterior slope form a plateau or ridge.

4. The fastening device of claim 1, said female component further comprising
    said female opening having a differing width at said female mounting surface and said female attachment surface.

5. The fastening device of claim 1, said female opening being a hole.

6. The fastening device of claim 1, said female opening having a hole.

7. The fastening device of claim 1, said female opening having no hole.

8. The fastening device of claim 1, said female opening having a plurality of holes.

9. The fastening device of claim 1, said female component or said male component having antimicrobial properties.

10. The fastening device of claim 1, said female opening having a semipermeable membrane.

11. The fastening device of claim 1 wherein a plurality of female components are affixed to said first surface or object and a corresponding number of male components are affixed to said second surface.

12. The fastening device of claim 1 further comprising a plurality of female components and a plurality of male components, wherein at least one female component comprises an opening having a semipermeable membrane and another female component comprises an opening without a semipermeable membrane.

13. The fastening device of claim 1 wherein said female opening and said male attachment member are of a corresponding shape that is an oval or any other shape having at least 3 sides.

14. The fastening device of claim 1, said female mounting surface is mounted to said first surface with glue, welding, stitching, stapling, nailing, screwing, hook and loop, snaps, melting, riveting, or any combination thereof.

15. The fastening device of claim 1, said female component or said male component comprising urethane, vinyl, polyvinyl chloride, one or more metals, carbon fiber, wood, plastic, or phenolic.

16. The fastening device of claim 1, said female component or said male component being radiolucent.

17. The fastening device of claim 1, said female component or said male component being stain resistant.

18. The fastening device of claim 1, said female component or said male component being fire resistant.

19. The fastening device of claim 1, said female component or said male component being electrically conductive.

20. The fastening device of claim 1, said female component or said male component having an etched surface.

21. The fastening device of claim 1 wherein said female component is attached to said first surface, forming a fluid passageway out of said first surface through said female opening.

22. The fastening device of claim 1 further comprising, on the opposite side of said male attachment member, a male mounting surface comprising a hole.

23. The fastening device of claim 1 wherein said female mounting surface is mounted to said first surface, said first surface is vented, said female opening has a hole positioned over the vented portion of said first surface, and forming a fluid passageway through said female component.

24. The fastening device of claim 1, wherein:
said male attachment member is coupled to said female opening; and
said broader male width resides at a depth within said female opening closer to said female attachment surface than the distance from said second depth to said female attachment surface.

25. The fastening device of claim 1, said female opening overlapping with a hole in said male component, creating a fluid passageway through said male component.

26. A fastening device comprising:
a first member having a first surface;
a second member having a second surface;
female attachment means for coupling male attachment means to female opening means; male attachment means for coupling to said female opening means;
female mounting surface means opposite said female attachment surface means configured for mounting said female attachment means to said first surface;
male mounting surface means opposite said male attachment means wherein said male mounting surface means configured for mounting said male attachment means to said second surface;
guiding means for guiding said male attachment means into said female opening means;
snap-fitting means for snapping said male attachment means into said female attachment means; and
a fluid passage for providing continuous fluid passage through said female opening means and said male attachment means;
wherein said male attachment means is joined to said female opening means, thereby attaching said first surface to said second surface.

27. The fastening device of claim 1 in which said first surface is the bottom surface of a surgical pad and said second surface is the upper surface of a surgical table.

* * * * *